United States Patent [19]
Peterson

[11] 3,960,726
[45] June 1, 1976

[54] AUTOMATIC FILTER LEVEL CONTROL BY DILUTION WITH FILTRATE

[75] Inventor: C. Lynn Peterson, Salt Lake City, Utah

[73] Assignee: Peterson Filters and Engineering Co., Salt Lake City, Utah

[22] Filed: July 28, 1971

[21] Appl. No.: 166,806

[52] U.S. Cl. .................................. 210/77; 210/86; 210/104; 210/110; 210/196
[51] Int. Cl.² ........................................ B01D 33/02
[58] Field of Search ............... 210/77, 86, 104, 196, 210/110, 111, 122, 123, 127, 137, 330, 331

[56] References Cited
UNITED STATES PATENTS

| | | | |
|---|---|---|---|
| 2,360,779 | 10/1944 | Lang et al. | 210/77 X |
| 2,576,275 | 11/1951 | Bench | 210/196 X |
| 2,678,733 | 5/1954 | Reeves | 210/110 |
| 2,851,161 | 9/1958 | Dahlstrom et al. | 210/77 X |
| 3,381,821 | 5/1968 | Hellstrom | 210/196 X |

FOREIGN PATENTS OR APPLICATIONS
279,766 10/1927 United Kingdom................. 210/196

OTHER PUBLICATIONS

Denver Equipment Co. Bulletin FG-B1 of Nenuga Colo., pp. 2–8 relied on. Copy received in group 176 on 3/1956.

Primary Examiner—John Adee
Attorney, Agent, or Firm—Bruce G. Klaas

[57] ABSTRACT

An automatic control is disclosed to keep rotary vacuum filter slurry feed below an upper overflow level and above a lower prime level in a continuous operation in closed circuit with at least one rotary separation stage comprising the slurry feed supply and into which excess filtrate is returned to maintain a predetermined slurry level at filtration. An operator regulates speed of separator rotation in accordance with measurement of level to provide selected speed of rotation for longest dry time for lowest cake moisture.

9 Claims, 2 Drawing Figures

U.S. Patent  June 1, 1976  3,960,726
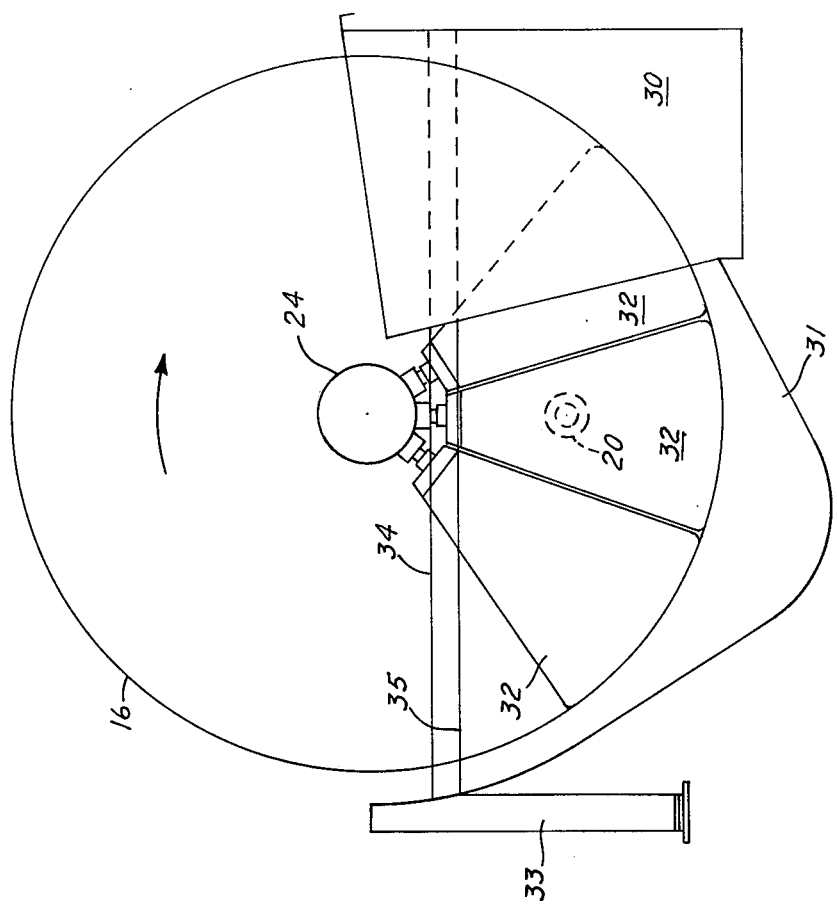
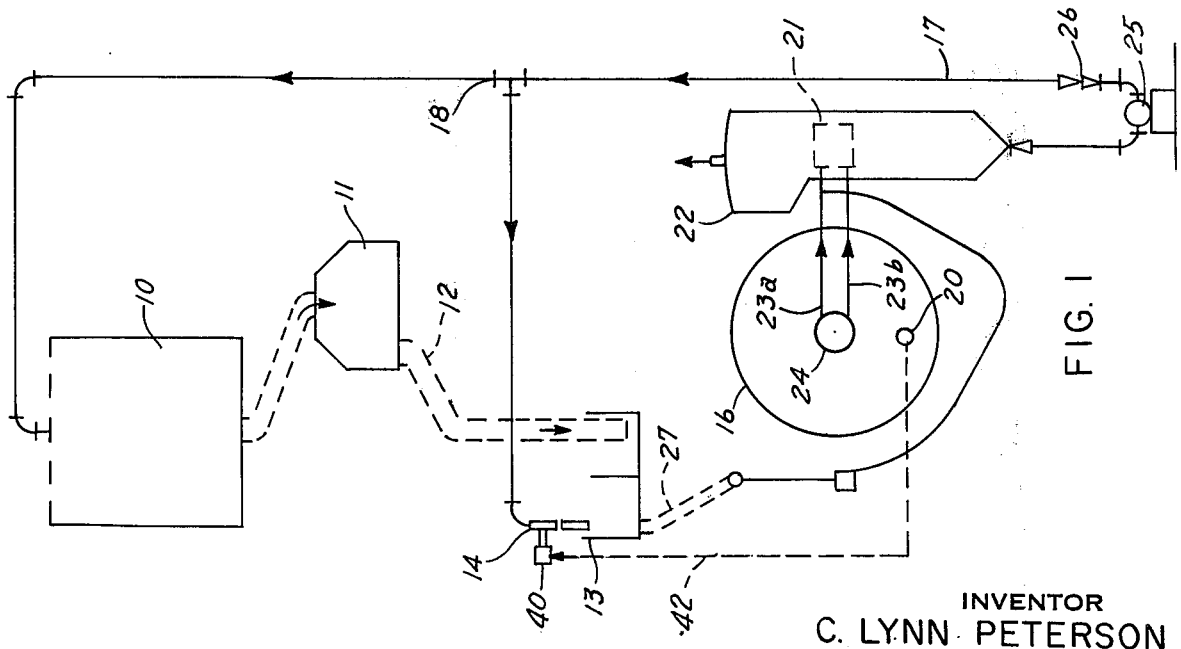
INVENTOR
C. LYNN PETERSON
BY
ATTORNEYS

AUTOMATIC FILTER LEVEL CONTROL BY DILUTION WITH FILTRATE

This invention relates to the dewatering of froth flotation concentrates and more particularly to froth flotation circuits in which a disc filter is employed to dewater flotation concentrates.

Rotary vacuum disc filters have become increasingly popular for taking coal froth concentrates passed directly to the filter thereby eliminating the use of a thickener. To accomplish this, emergency overflows are provided on the filter tanks and if the froth feed overflows, the overflow material must be pumped back to the froth flotation cells. This causes a great deal of difficulty to the circuit operation as it not only increases the load on the flotation cells but it also adds another pump to the circuit and the froth slurry is not easy to pump due to the foam or froth generated by the presence of collector and frother reagents in the concentrate.

Therefore, it is apparent that some automatic means must be used to keep the filter from overflowing in an efficient operation. This is particularly true in the case of the direct feed froth filter. Level control is not so important on a coal refuse filter handling tailings since the feed to such a filter is from a thickener and the overflow can be directed back to the thickener, usually by gravity without requiring a pump.

The above problems with overflow are quite obvious. However, there is also a low level to consider in level control, and if it is exceeded, air is drawn into the filter sector at its top and the siphon effect is broken. In the trade, it is said that the filter loses its prime. Hence, this level is referred to as the prime level. In other words, it is the lower limit for the level control and a less apparent condition, since the top of the sectors must be submerged at all times during filtering to prevent the filter from losing its prime and the benefits of having a steady operation.

In the practice of my invention, there are three overriding objectives in addition to the control levels. They are:

1. The level control should be consistent with providing the longest dry time for the lowest cake moisture. This dry time is related to filter rotation speed since the lower the disc speed, the longer the dry time. Therefore, the lowest disc speed consistent with cake thickness or capacity and cake moisture is desirable.

2. The system should take into account reducing the amount of filtrate returned to the froth cells. The solids in this filtrate must be re-floated or again concentrated before returning to the filter as slurry feed.

3. This filtrate return should be as steady as possible so as not to upset the adjustments on the froth cells.

This invention proceeds in the belief that the above objectives can best be satisfied by using filtrate for dilution and level control as compared to using automatic disc speed control. In doing so, the following five variables must be taken into consideration:
1. Cake rate.
2. Filtrate rate.
3. Percent solids in feed.
4. Size consist, particularly percent -200 mesh.
5. Disc speed.

In a circuit in which clean coal feed is used to form the filter slurry, if the feed volume is not great enough, the level goes down exposing the top of the sectors, or the filter loses its prime, i.e., will not pick up a cake. To prevent these two conditions, automatic disc speed on a level controller has been used in some installations. This problem is particularly difficult on a clean coal feed made up of underflow from thickener cyclones plug −100 mesh froth feed. Since the cyclone underflow is 35% to 45% solids and the froth at over 20%, the resulting combined feed to the filter approaches 30% solids. Both are relatively free filter products, particularly the cyclone underflow which is void of 100 × 0. Therefore, the filter pulls too heavy a cake and quickly reduces the filter level below the sectors unless dilution water is added.

The most convenient water for this dilution is plant recirculating water, but this usually upsets the plant water balance, especially if it is not considered in advance. In any event, the filtrate volume is greatly increased, and since it goes back to the froth cells, their feed volume is increased, requiring adjustment which may be frequent if the froth cells do not settle down to deliver more −100 × 0 to the filter to reduce dilution requirements.

Under these conditions, automatic disc speed tends to compound the problem. The highest disc speed range must be set for the level as it approaches the overflow weir on the disc filter tank. However, while this level is being approached, the filter is filling with cyclone product which is free filtering and faster disc speed is required to keep the cake thickness within reasonable limits, say under 3 inches thick. In such event, either the automatic disc control must be manually operated or even more dilution must be added. Manual operation of the automatic disc control is very touchy so dilution turns out to be the most reliable. Note that if the disc speed is manual, the operator can easily set the disc speed according to cake thickness. This may be higher than normal until the froth cells produce the proper −100 × 0 addition.

It is an object of my invention to provide a simple, economical and efficient control for the slurry supply of a rotary vacuum filter which automatically maintains a level in the body of slurry between an overflow level and a prime level by regulated return of filtrate thereto.

Another object of my invention is to provide a level control for the body of slurry feed to a rotary vacuum filter which permits a filter rotation providing maximum dry time for the lowest cake moisture on the filter.

A further object of my invention is to provide simple, durable and efficient apparatus for installation in a closed circuit of a rotary vacuum filter and one or a plurality of froth flotation cells so as to provide an automatic level control in the slurry tank of the filter between an upper overflow level and a lower prime level thereby permitting filter rotation establishing maximum dry time for the lowest cake moisture on the filter.

Still another object of my invention is to provide a control system or apparatus for use in filter and flotation cell closed circuits which provides an efficient level control of the slurry feed to the filter in an automatic operation with selective manual regulation of the speed of filter rotation so as to prevent return of excess solids to flotation and permit filter rotation providing maximum dry time for the lowest cake moisture on the filter.

Other objects reside in the provision of novel details of construction and novel combinations and arrangements of parts, all of which will be set forth in the course of the following description.

The practice of my invention will be described now with reference to the accompanying drawings. In the drawings, in the two views of which like parts bear similar reference numerals, FIG. 1 is a flow sheet type of drawing illustrating a froth cell and distributor in closed circuit with a filter of the type shown in FIG. 2 and showing an arrangement of the control features of my invention; and FIG. 2 is a side elevation view, partially broken to show the arrangement of concealed parts of a rotary disc vacuum filter utilizing control features of my invention.

The level control of the present invention has been illustrated as installed in a closed circuit of one or a plurality of flotation cells and a rotary vacuum filter which is depicted by the flow sheet drawing FIG. 1. In FIG. 1, a source of supply 10, usually a large distributor box, delivers a flotation size pulp into one or a plurality of flotation cells 11, here shown as one, with the froth concentrate from cell 11 being delivered by a conduit 12 into a feed box 13. Filtrate from disc vacuum filter 16 is returned through a line 17 and a reducing T 18 diverts one portion of the return flow to a squeeze valve 14 which regulates filtrate flow into feed box 13. The remaining flow through line 17 is delivered into supply source 10 as part of the pulp make-up to flotation.

The slurry formed in feed box 13 is a mixture of flotation concentrate and return filtrate with the amount of filtrate return automatically controlled. Squeeze valve 14 obtains its signal from a transmitter 20 which measures the increase or decrease in level in the filter 16. Transmitters of this type are available commercially and the "Fisher 115C" is well suited for this purpose. The transmitter 20 is in circuit with a controller 21 which has a proportional range and controls the amount of air put on squeeze valve 14 depending on the level in the filter. The output of feed box 13 passes through a line 27 into filter 16.

As shown in FIG. 1, controller 21 is located within a vacuum receiver 22 which has a connection with a vacuum pump (not shown) for separation of the air and filtrate. The plant air supply (not shown) comprises the source of pneumatic force applied against squeeze valve 14. The shaft 24 of filter 16 has two horizontal lines connected through controller 21 in vacuum receiver 22 which prevents later intermixing, and air is conducted through the top connection 23a and filtrate through the bottom connection 23b. A pump 25 receives a flow of filtrate at its intake and discharges into a discharge line 17 having a check valve 26.

FIG. 2 illustrates the installation of FIG. 1 utilizing a rotary disc vacuum filter 16 as the filter mechanism of the treatment and such filters are widely used commercially in filtering coal slurries. The filter disc assembly is seated on the upright walls 30 of a slurry tank 31. Each disc of the assembly comprises a circumferential series of sectors 32, only three of which have been shown for convenience of illustration. An overflow box 33 prevents slurry spillage if the tank becomes too full. The location of the overflow level is shown at 34 and the prime level position is at 35. It will be noted that the top surface of sides 30 is substantially above the tank overflow level 34 so as to confine froth which may be standing on the surface of the confined liquid.

One way to understand the interrelation of the aforementioned variables when using a system of the type disclosed herein is to understand what happens on the startup of a filter on froth feed. The filter tank 31 is empty which is obviously at very lowest level and squeeze valve 14 is then open for maximum dilution. On the other hand, when disc speed is used for a level control, the disc speed will be at the very slowest speed since the transmitter is reading a low level. This is undesirable.

When the level comes up and over the prime level, the vacuum is turned on in the filter. This produces filtrate and since the squeeze valve is open, most of it is returned to the filter and dilutes the feed. In some cases, water cyclones are used in conjunction with froth feed. The classifier cyclones following the water cyclones thicken the feed at the underflow nozzles to around 45%. This feed usually comes to the filter ahead of the froth since it takes a little while to build up a froth on the cells. This means that this initial feed is practically void of −200 mesh material and has a very high filter rate. If dilution is not added, the cake approaches 6 inches thick and the level is pulled down below the prime level so that the extra heavy cake falls off back into the tank. This partially dewatered cake makes the solids even thicker in the tank and compounds the condition. A shutdown is usually required. The tank must be drained and flushed out before another start.

With dilution, the operator can manually speed up the discs and keep the cake thickness within reason. Even with straight froth feed, that is, without cyclone underflow, the froth cells are usually not completely adjusted and on start-up, the filter receives a coarser feed than will be normal. This means that with disc speed control, some dilution is required in order to maintain the level over the prime. Consequently, automatic dilution is a beneficial solution.

Also on initial start systems, sometimes the coal fed to the plant is oxidized from storage awaiting start-up. In this case, the fine oxidized coal does not float and here again there is a very coarse feed for start-up which requires dilution. As the feed settles down to normal with corrections in the above conditions, the −200 mesh content increases and the filter rate is reduced. As the filter rate is reduced, the level starts to come up which signals the squeeze valve to throttle and reduce dilution. The operator then manually slows down the disc speed to obtain the longest dry time at a reasonable cake thickness for the prevailing normal conditions. Note that there can be a fairly wide change in the conditions at the same disc speed. This change is usually not sudden because other devices in the plant must be fed at a fairly uniform rate in order for them to give a good performance.

Now suppose the froth cells get out of adjustment and add excess water to the filter feed. The feed is thinned down, making the level rise, which will signal the dilution valve to throttle and prevent the level from reaching the overflow. The reverse is also true. If the primary feed becomes thicker, such as when the push water is low for the tonnage on the cyclones, the level will go down, but then the squeeze valve opens, adding more dilution and keeping the filter level above the prime level. The same is true with the change in −200 mesh. With the disc speed for level control, as the level goes down, the disc is slowed down making a thicker cake. If there is a very great change in the −200 mesh in the feed, a condition can quickly develop where the level goes below the prime level unless the feed is diluted manually. In this case, as the level goes down, the disc is being slowed down, resulting in excessive cake thickness which is more difficult to lift from the slurry and makes the filter more sensitive for losing the cake as the prime level is approached. So here again, automatic dilution in the first instance is a beneficial solution.

I claim:

1. The combination with a rotary vacuum filter having a slurry tank including an upper overflow level and a lower prime level, of an adjustable mechanism for returning filtrate to the slurry tank at a controlled rate so as to maintain the slurry level therein between the overflow level and the prime level, and means controllably associated with said mechanism for determining level variations in said slurry tank and adjusting said mechanism in accordance therewith.

2. A combination as defined in claim 1, in which the mechanism automatically controls filtrate input to the slurry tank in response to level variations in the slurry tank.

3. A combination as defined in claim 1, in which a squeeze valve provides the control of the returning filtrate to the slurry tank in accordance with indicated level variations in the slurry tank.

4. A combination as defined in claim 1, in which the mechanism automatically controls returning filtrate input to the slurry tank so as to vary the density of the slurry in the tank.

5. A combination as defined in claim 1, in which the means for indicating level variations actuates a pneumatic system controlling a squeeze valve and the squeeze valve setting determines the volume of filtrate input to the slurry tank.

6. A system for dewatering flotation concentrates comprising means for delivering a flotation pulp to at least one flotation cell, means for delivering a concentrate pulp type slurry from said cell to a feed source for a rotary vacuum filter, a rotary vacuum filter having a slurry tank connected to said feed source and an established upper overflow slurry level and an established lower prime slurry level in said slurry tank and receiving from said feed source, conductive means for directing filtrate from the filter in closed circuit with the means for delivering a flotation pulp to at least one flotation cell and to the feed source to the filter, and means for automatically regulating the quantity of filtrate returning to said feed source in response to signaled determination of level fluctuations in the slurry tank between said overflow level and said prime level.

7. Apparatus for maintaining a variable slurry level between predetermined maximum and minimum levels in a slurry tank of a vacuum filter unit comprising:
a supply source of slurry,
feed box means connected to said supply source, and receiving a slurry supply therefrom,
flow passage means connecting said feed box means to the slurry tank of the vacuum filter unit and delivering a slurry supply thereto from said feed box means,
filtrate discharge passage means connected to the vacuum filter unit to remove filtrate therefrom,
filtrate pump means connected to said filtrate discharge passage means,
filtrate return passage means connected to said filtrate discharge passage means through said filtrate pump and to said supply source and to said feed box to deliver filtrate to each,
variable flow control valve means associated with said filtrate return passage means to vary the amount of filtrate received by said feed box means, and
level sensing means in said vacuum filter unit controllably associated with said variable flow control valve means to vary the flow of filtrate to said feed box means in accordance with the slurry level in said filter unit to thereby maintain the slurry level in said vacuum filter unit between said predetermined maximum and minimum slurry levels.

8. The invention as defined in claim 7 and wherein the filtrate in said filter unit being connected to said feed box means in closed circuit through said filtrate discharge passage means and said pump means and said filtrate supply means.

9. The method of maintaining a predetermined slurry level in a slurry tank of a vacuum filter unit in a range between a predetermined low level and a predetermined high level comprising:
providing a slurry source and connecting the slurry source to the slurry tank by passage means therebetween,
removing filtrate from the filter unit and delivering at least a portion of the filtrate to the passage means and mixing the filtrate with the source slurry to vary slurry level in the slurry tank, and
automatically controlling the amount of filtrate delivered to and mixed with the source slurry by control signal responsive means in accordance with the level of slurry in the slurry tank continuously operable during filter unit operation providing continuous control signals for the control signal responsive means.

* * * * *

UNITED STATES PATENT OFFICE
CERTIFICATE OF CORRECTION

PATENT NO. : 3,960,726
DATED : June 1, 1976
INVENTOR(S) : C. Lynn Peterson

It is certified that error appears in the above-identified patent and that said Letters Patent are hereby corrected as shown below:

Column 2, line 5, delete "plug" and insert therefor --plus--. Claim 9, line 15, after "tank" insert --as determined by level measuring means in the slurry tank--.

Signed and Sealed this

Twenty-ninth Day of March 1977

[SEAL]

Attest:

RUTH C. MASON
Attesting Officer

C. MARSHALL DANN
Commissioner of Patents and Trademarks